US008763128B2

(12) United States Patent
Lim et al.

(10) Patent No.: US 8,763,128 B2
(45) Date of Patent: Jun. 24, 2014

(54) APPARATUS AND METHOD FOR DETECTING MALICIOUS FILES

(71) Applicant: Ahnlab, Inc., Gyeonggi-do (KR)

(72) Inventors: Cha Sung Lim, Gyeonggi-do (KR); Ju Seok Lee, Gangwon-do (KR)

(73) Assignee: Ahnlab, Inc., Gyeonggi-Do (KR)

( * ) Notice: Subject to any disclaimer, the term of this patent is extended or adjusted under 35 U.S.C. 154(b) by 0 days.

(21) Appl. No.: 13/777,181

(22) Filed: Feb. 26, 2013

(65) Prior Publication Data
US 2013/0305366 A1 Nov. 14, 2013

(30) Foreign Application Priority Data

May 11, 2012 (KR) .................. 10-2012-0050155

(51) Int. Cl.
*G06F 21/00* (2013.01)
(52) U.S. Cl.
USPC ............................................................ 726/24
(58) Field of Classification Search
CPC ...... G06F 12/1441; G06F 12/14; G06F 21/52
USPC .................................................... 726/23, 24
See application file for complete search history.

(56) References Cited

U.S. PATENT DOCUMENTS

| 7,437,759 | B1 * | 10/2008 | Szor ................................. 726/22 |
| 7,540,026 | B1 * | 5/2009 | Szor et al. ......................... 726/22 |
| 7,562,391 | B1 * | 7/2009 | Nachenberg et al. ............ 726/23 |
| 7,716,495 | B2 * | 5/2010 | Shupak et al. ................. 713/193 |
| 7,752,459 | B2 * | 7/2010 | Cowan et al. ................. 713/190 |
| 7,793,346 | B1 * | 9/2010 | Daub ................................ 726/22 |
| 7,814,333 | B2 * | 10/2010 | Choi et al. ..................... 713/187 |
| 7,856,538 | B2 * | 12/2010 | Speirs et al. .................... 711/152 |
| 7,950,057 | B1 * | 5/2011 | Kennedy et al. ................. 726/22 |
| 7,962,952 | B2 * | 6/2011 | Saito ................................. 726/4 |
| 7,971,255 | B1 * | 6/2011 | Kc et al. .......................... 726/24 |
| 8,127,144 | B2 * | 2/2012 | Isogai et al. ................... 713/187 |
| 8,141,163 | B2 * | 3/2012 | Pike ................................. 726/26 |
| 8,315,382 | B2 * | 11/2012 | Fischer .......................... 380/43 |
| 8,458,792 | B2 * | 6/2013 | Chow et al. ..................... 726/22 |

(Continued)

FOREIGN PATENT DOCUMENTS

| KR | 1020090120717 | 11/2009 |
| KR | 1020100005518 | 1/2010 |
| KR | 10-0945247 | 3/2010 |

OTHER PUBLICATIONS

Runtime Countermeasures for Code Injection Attacks Against C and C++ Programs; Yves Younan, Wouter Joosen, and Frank Piessens; ACM Computing Surveys, vol. 44, No. 3, Article 17, Publication date: Jun. 2012.*

(Continued)

*Primary Examiner* — Luu Pham
*Assistant Examiner* — James Turchen
(74) *Attorney, Agent, or Firm* — Bacon & Thomas, PLLC

(57) ABSTRACT

An apparatus for detecting a malicious file, includes a program driving unit configured to output an execution address of a command executed by driving a program corresponding to a non-executable file; and an address storage unit configured to store normal address range information in accordance with the driving of the program.

Further, the apparatus includes a maliciousness determination unit configured to determine whether the non-executable file is malicious depending on whether the execution address is not within the normal address range information.

15 Claims, 4 Drawing Sheets

(56) References Cited

U.S. PATENT DOCUMENTS

| | | | |
|---|---|---|---|
| 8,464,050 B2 * | 6/2013 | Fanton et al. | 713/165 |
| 2008/0028462 A1 * | 1/2008 | Burtscher | 726/22 |
| 2008/0148399 A1 * | 6/2008 | Winkler | 726/22 |
| 2009/0094585 A1 * | 4/2009 | Choi et al. | 717/131 |
| 2009/0158430 A1 * | 6/2009 | Borders | 726/23 |
| 2010/0281540 A1 * | 11/2010 | Alme | 726/23 |
| 2011/0191848 A1 * | 8/2011 | Zorn et al. | 726/22 |
| 2012/0096554 A1 * | 4/2012 | Stranne | 726/24 |
| 2013/0160125 A1 * | 6/2013 | Likhachev et al. | 726/24 |

OTHER PUBLICATIONS

Korean Patent & Trademark Office Office Action dated Jun. 12, 2012.

* cited by examiner

APPARATUS AND METHOD FOR DETECTING MALICIOUS FILES

FIELD OF THE INVENTION

The present invention relates to an apparatus and a method for detecting malicious files; and more particularly, to an apparatus and a method for detecting whether or not a non-executable file includes a malicious code, and a computer readable storage medium for storing a computer program.

BACKGROUND OF THE INVENTION

Along with popularization of the Internet and wireless communication devices, an infection route of malicious software or a malicious code becomes various, and damages caused therefrom are increasing every year. A malicious code refers to software that is intended to cause undesired effects such as system failure, information outflow or the like against user's intention and advantages. The malicious code includes hacking tools such as virus, worm, trojan, backdoor, logic bomb, trap door or the like, and malicious spyware, ad-ware or the like. The malicious code causes problems such as outflow of personal information, e.g., user identification information (ID), password or the like, object system control, file deletion/change, system failure, service denial of application program/system, core data outflow, installation of other hacking programs or the like through a self-reproduction function or an automatic propagation function, and damages caused therefrom are considerably various and serious.

To that end, a malicious code curing system (vaccine program) that detects and cures a malicious code has been developed. Most of the malicious code curing systems (vaccine programs) that have been known use a file-based diagnosis method. This is because most of the malicious codes have a file format that may be executed in a specific system. For example, the malicious code generally has an execution file (PE: Portable Executable) format to be executed in a window system. An extension of a file having the PE format includes exe, cpl, ocx, dll, vxd, sys, scr, dry or the like. In order to diagnose the malicious code having the execution file (PE) format, the malicious code curing system needs to have a specific signature capable of recognizing such file format and determining such code as the malicious code. This diagnosis method is the same as a signature-based or string inspection method employed by most of the malicious code curing systems. The signature-based diagnosis method is used for inspecting specific parts or unique parts of the file classified into the malicious code. Thus, the signature-based diagnosis method is advantageous in that precise diagnosis may be performed while minimizing false positive and false negative and also in that scanning may be rapidly performed by comparing specific parts of the files during the file inspection. However, the signature-based diagnosis method may not deal with a new file that is slightly changed, because the false negative in which the file of the malicious code may not be diagnosed even if only hundreds bits of the file are changed occurs. The signature-based diagnosis method may deal with only a known malicious code, and thus may not deal with a new malicious code that has not been known.

Meanwhile, an APT (Advanced Persistent Threat) attack that attracts attention recently utilizes various malicious codes by applying a high-level attack technique to allow an attacker to set a specific target and extract desired information. Especially, the APT attack is not detected in an initial invasion stage, and a Non-PE (Non-Portable Executable) file including a malicious code is widely used. This is because a program (e.g., document creating program or image program) for executing a non-executable file basically has a certain level of security vulnerability, and also because a variant malicious code may be easily generated by including the malicious code in the non-executable file to change the file.

Due to such characteristics, the APT attack performs frequently Zero Day attack by using a malicious non-executable file exploit. For example, when a recipient opens a malicious non-executable file attached to an email, the computer of the recipient may be infected by the malicious file and may attack another computer. Further, the malicious file may intrude the system and allows core data to be leaked to the outside. Further, the non-executable file has various formats, so that an analyzer requires a considerable amount of time and effort to determine whether the non-executable file is malicious and analyze malicious behaviors in the case of the Zero-Day Exploit using the malicious non-executable file. Moreover, a conventional technique may hardly deal with various malicious non-executable files that are modified or newly generated during the analysis.

For example, a conventional signature-based inspection method needs to have mass signature database to detect various attack methods. However, it is practically difficult to block the zero day exploit using the malicious non-executable file.

In addition, a conventional behavior-based detection method requires information such as a design method or the like to detect behaviors of various attackers, which results in a lot of problems such as false positive and false negative.

In order to solve such problem, a malicious code curing system capable of rapidly and accurately detecting whether a non-execution file includes a malicious code needs to be developed.

SUMMARY OF THE INVENTION

In view of the above, the present invention provides an apparatus and a method for detecting a malicious code of a non-executable file, capable of obtaining normal address range information of a module loaded by execution of a program of the non-executable file and determining whether the non-executable file is malicious by comparing the normal address range information and an execution address.

The purpose of the present invention is not limited thereto, and other purposes that have not been mentioned will be obvious to those skilled in the art from the following description.

In accordance with a first aspect of the present invention, there is provided an apparatus for detecting a malicious file, including: a program driving unit configured to output an execution address of a command executed by driving a program corresponding to a non-executable file; an address storage unit configured to store normal address range information in accordance with the driving of the program; and a maliciousness determination unit configured to determine whether the non-executable file is malicious depending on whether the execution address is not within the normal address range information.

Further, the program driving unit may determine a file format of the non-executable file, and selects and drives a program for executing the non-executable file based on the determined file format.

Further, the maliciousness determination unit may determine, when the execution address is not within the normal address range information, whether or not a memory region indicated by the execution address has execution properties, and determines whether the non-executable file is malicious based on the determination result.

Further, the maliciousness determination unit may determine, when the memory region indicated by the execution address does not have execution properties, whether the non-executable file is malicious by checking whether an abnormal event occurs due to an execution of a code stored in the memory region indicated by the execution address.

Further, the maliciousness determination unit may determine, when the abnormal event does not occur, whether the non-executable file is malicious by checking whether an execution address for a predetermined step after the execution address indicates the normal address range information.

Further, the maliciousness determination unit may determine, when the memory region indicated by the execution address is determined to have execution properties, the non-executable file to be normal.

Further, the apparatus may further comprise a malicious code extraction unit configured to extract a code in a region corresponding to an execution address that is not included in the normal address range information.

Further, the apparatus may further comprise a cause analysis unit configured to analyze cause for vulnerability by comparing vulnerability information and a module including a command related to the execution address that is not included in the normal address range information.

Further, the normal address range information may include a start address and an end address of a module loaded by the driving of the program.

Further, the execution address may be provided from an EIP (Extended Instruction Pointer) register of a central processing unit.

Further, the maliciousness determination unit may store an execution address of a command executed immediately before the execution of the execution address that is not included in the normal address range information.

In accordance with a second aspect of the present invention, there is provided a method for detecting a malicious file including: obtaining an execution address of a command executed during driving of a program corresponding to a non-executable file; storing normal address range information in accordance with the driving of the program; and determining, when the obtained execution address is not included in the normal address range information, whether the non-executable file is malicious.

Further, said determining whether the non-executable file is malicious may include: determining, when the execution address is not included in the normal address range information, whether a memory region indicated by the execution address has execution properties; and determining whether the non-executable file is malicious based on the determination result.

Further, said determining whether the non-executable file is malicious may include checking, when the memory region indicated by the execution address does not have execution properties, whether an abnormal event occurs due to execution of a code stored in the memory region indicated by the execution address; and determining, when the abnormal event occur, the non-executable file to be malicious.

Further, said determining whether the non-executable file is malicious may include checking, when the abnormal event does not occur, whether an execution address for a predetermined step after the execution address indicates the memory region that is not included in the normal address range information; determining, when the execution address for the predetermined step indicates the memory region that is not included in the normal address range information, the non-executable file to be malicious.

Further, the method may further comprise determining a format of the non-executable file, wherein a program corresponding to the non-executable file is driven based on the determined file format.

Further, the method may further comprise extracting a code in a memory region indicated by the execution address that is not included in the normal address range information.

Further, the method may further comprise analyzing cause for vulnerability by comparing vulnerability information and a module including a command related to an execution address that is not included in the normal address range information.

Further, the normal address range information may include a start address and an end address of a module loaded by driving of the program.

Further, the execution address may be provided from an EIP register of a central processing unit.

Further, said determining whether the non-executable file is malicious may include determining whether the execution address is within the normal address range based on a type of the executed command.

Further, when the command is structured example handling (SEH), whether a chain value of the SEH is within the normal address range information may be determined.

Further, when the command is return, call or jump, a single step may be performed to determine whether the execution address indicated by the command is within the normal address range information.

Further, the code may be a malicious shell code.

Further, the method may further comprise storing an execution address of a command executed immediately before the execution of the execution address that is not included in the normal address range information.

In accordance with the present invention, a malicious non-executable file may be detected before a malicious code is executed by obtaining normal address range information including a start address and an end address of a module that is normally loaded by execution of a program and then determining, when an execution address outputted in the case of executing each command in a program module is not within the normal address range information, that the non-executable file includes the malicious code.

Further, the present invention may increase accuracy in determining whether the non-executable file is malicious by obtaining the normal address range information of a module that is normally loaded by execution of a program and then determining whether the execution address outputted in the case of executing each command in the program module is within the normal address range information.

Accordingly, it is possible to effectively deal with an APT attack scenario using vulnerability of a malicious non-executable file or the like.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

The term "non-executable file" used in this specification refers to a file that is not self-executed, which is a contrary to an execution file or an executable file. For example, a non-executable file may be a text file such as hwp, doc or the like, an image file such as JPG or the like, a moving picture file, a JAVA SCRIPT file, a HTML file or the like, but is not limited thereto.

A malicious non-executable file containing a malicious code may be used for an APT (Advanced Persistent Threat) attract or the like via attachment to an email or transmission of a malicious non-executable file through a network. In that case, the malicious code may be a shell code, and the malicious shell code may be executed when a program corresponding to the format of the non-executable file is executed. The format of the non-executable file may be, e.g., hwp file, doc file, pdf file, jpg file, js file, html file or the like.

The malicious non-executable file may contain a malicious shell code. The malicious non-executable file containing the malicious shell code is moved to a malicious shell code region when a command is executed. The movement to the malicious shell code region may be expected by checking an execution address. For example, an execution address of a command to be executed next may be checked by a value stored in an EIP (Extended Instruction Pointer) register as one of registers of a central processing unit (CPU). Accordingly, existence/non-existence of a command that is not within a normal address range and moved to the malicious shell code region may be important in determining whether or not a non-executable file is malicious.

Figure 1:
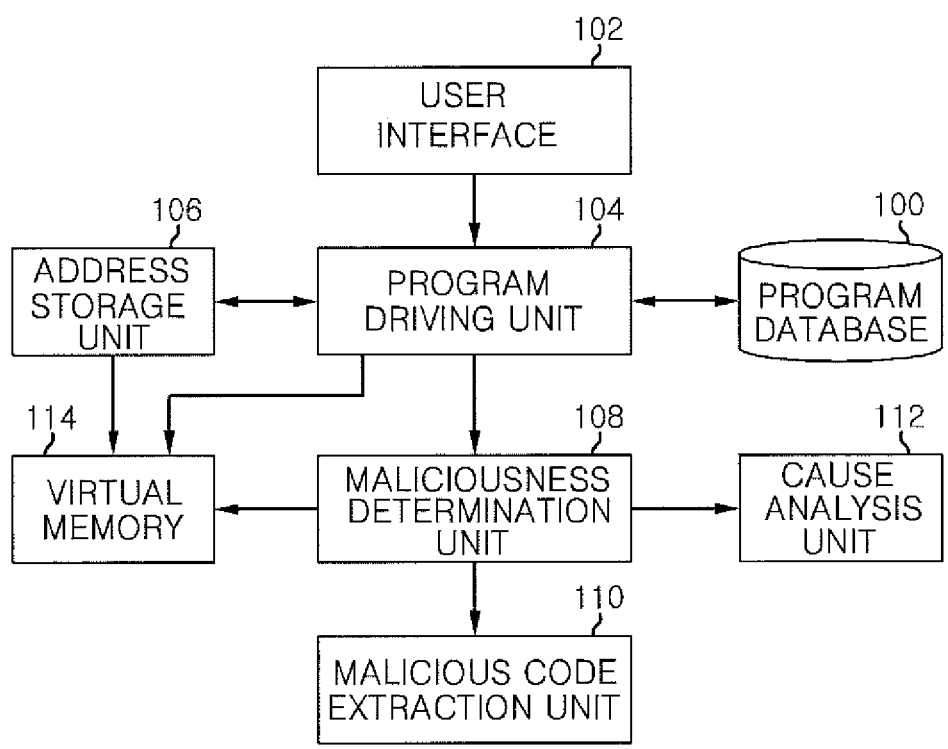
FIG. 1 is a block diagram illustrating an apparatus for detecting a malicious code of a non-executable file in accordance with an embodiment of the present invention.

FIG. 1 is a block diagram showing an apparatus for detecting a malicious code of a non-executable file in accordance with an embodiment of the present invention. Hereinafter, a configuration and an operation of the apparatus for detecting a malicious code of a non-executable file in accordance with an embodiment of the present invention will be described in detail with reference to FIG. 1.

As shown in FIG. 1, the apparatus for detecting a malicious file in accordance with an embodiment of the present invention loads and executes a non-executable file in a program, analyzes whether or not a non-executable file contains a malicious code by the execution of the program, and reports the analysis result. To do so, the malicious file detection apparatus may include a program database 100, a user interface 102, a program driving unit 104, an address storage unit 106, a maliciousness determination unit 108, a malicious code extraction unit 110, a cause analysis unit 112, a virtual memory 114 and the like.

The program database 100 stores various programs for executing a non-executable file inputted for malicious code detection.

The user interface 102 may provide an interface for selecting a non-executable file or a directory in which a non-executable file to be inspected is stored.

The program driving unit 104 determines a format of the non-executable file selected through the user interface 102 and searches a program database 100 based on the determined format to select a program capable of executing the non-executable file.

The program driving unit 104 loads and executes the non-executable file in the selected program and then outputs an execution address of each command in the module of the program to the maliciousness determination unit 108 by the loading of the non-executable file. Here, the module may include, e.g., a DLL (Dynamic Linking Library) or the like.

Meanwhile, the program driving unit 104 loads the non-executable file in the selected program and executes the loaded file in a virtual environment.

The program driving unit 104 provides an execution address of a command by using the information stored in the register of the CPU (Central Processing Unit). For example, a memory address of a command to be executed next may be stored in an EIP (Extended Instruction Pointer) register of the CPU.

The address storage unit 106 stores in the virtual memory 114 normal address range information including a start address and an end address of a module that is normally loaded by execution of a program.

The maliciousness determination unit 108 receives, when each command in the module of the program is executed by the loading of the non-executable file in the program, the execution address of each command from the program driving unit 104 and then determines whether or not the non-executable file is malicious based on whether or not the received execution address is within the normal address range information. For example, when the execution address stored in the EIP register of the central processing unit is not within the normal address range information, the non-executable file may be classified as a malicious file.

The maliciousness determination unit 108 determines the region indicated by the execution address, i.e., the region that is not within the normal address range information, as the malicious shell code region, and stores in the virtual memory 114 the execution address of the command executed immediately before the execution of the command of the execution address that indicates the malicious shell code region.

The maliciousness determination unit 108 performs a single step in accordance with a type of a command and compares the execution address outputted from the program driving unit 104 and the normal address range information, thereby determining whether or not a non-executable file is malicious. More specifically, the maliciousness determination unit 108 may determine whether or not the execution address is within the normal address range information by performing a single step in accordance with a type of a command or determine whether or not the execution address is within the normal address range information without performing a single step. For example, when the command is a structured exception handling (SEH), the maliciousness determination unit 108 may compare the normal address range information and the chain value of the SEH. In the case of commands such as return, call, jump and the like, whether or not the execution address is within the normal address range information is determined by performing a single step. Here, the chain value of the SEH refers to an address to be executed.

However, the maliciousness determination unit 108 may perform exception handling when the normal program executes the command outside the normal address range information of the normal module in order to load the non-executable file.

The following is description of the case of performing exception handling. When the execution address is not within the normal address range information, the maliciousness determination unit 108 determines the properties of the memory region indicated by the execution address. When the memory region is determined to have execution properties, the corresponding non-executable file is determined to be normal. On the contrary, when the properties of the memory region are determined to be execution properties, it is determined whether or not the event occurs in accordance with the execution of the code stored in the memory region indicated by the execution address is abnormal.

Here, the normal event may include the following examples:
  Access Violation;
  EXCEPTION_ARRAY_BOUNDS_EXCEEDED:
  EXCEPTION_DATATYPE_MISALIGNMENT:
  EXCEPTION_FLT_DENORMAL_OPERAND:
  EXCEPTION_FLT_DIVIDE_BY_ZERO:
  EXCEPTION_FLT_INEXACT_RESULT:
  EXCEPTION_FLT_INVALID_OPERATION:
  EXCEPTION_FLT_OVERFLOW:
  EXCEPTION_FLT_STACK_CHECK:
  EXCEPTION_FLT_UNDERFLOW:
  EXCEPTION_GUARD_PAGE:
  EXCEPTION_ILLEGAL_COMMAND:
  EXCEPTION_IN_PAGE_ERROR:
  EXCEPTION_INT_DIVIDE_BY_ZERO:
  EXCEPTION_INT_OVERFLOW:
  EXCEPTION_INVALID_DISPOSITION:
  EXCEPTION_INVALID_HANDLE:
  EXCEPTION_NONCONTINUABLE_EXCEPTION:
  EXCEPTION_PRIV_COMMAND:
  EXCEPTION_STACK_OVERFLOW:
but is not limited thereto.

When the abnormal event occurs, the maliciousness determination unit 108 determines the non-executable file as the malicious code and stores in the virtual memory 114 the execution address of the command executed immediately before the execution of the command of the execution address that is not within the normal address range information.

Meanwhile, when the abnormal event does not occur, the maliciousness determination unit 108 determines whether or not the non-executable file is malicious by comparing the normal address range information and the execution address of the command for a predetermined step, e.g., 3-5 steps. In other words, when the execution address of the commands for the predetermined step is not within the normal address range information, the maliciousness determination unit 108 determines the non-executable file to be malicious. When the execution address of the command before the predetermined step is within the normal address range information, the maliciousness determination unit 108 determines the non-executable file to be normal and executes the commands of the following steps.

The malicious code extraction unit 110 extracts a shell code in a region corresponding to the execution address that is not within the normal address range information in the format of an execution file or an executable file and then stores the extracted file in the virtual memory 114. Here, the execution file or the executable file may be exe, cpl, dll, ocx, vxd, sys, scr, dry or the like, but is not limited thereto.

The malicious code extraction unit 110 transmits the code extracted in the format of an execution file or an executable file to a malicious code inspection and analysis server (not shown) connected to a communication network (not shown) in order to request analysis thereof.

The cause analysis unit 112 may analyze cause for vulnerability by comparing the information on the module classified as a malicious module, the execution address that is not within the information, and the prestored vulnerability information, and then provides the analysis result to a user or an analyzer. Here, the vulnerability information may be provided from CVE (Common Vulnerabilities and Exposures), Microsoft Security Bulletin (e.g., MS11-002), NVD (National Vulnerability Database), US-CERT Bulletin or the like, but is not limited thereto.

In the embodiment of the present invention, the case in which the cause analysis unit 112 is installed in the apparatus for detecting a malicious file has been described as an example. However, the cause analysis unit 112 may be installed in an additional analysis server (not shown) connected through a communication network.

The operation of the apparatus for detecting a malicious file having the above configuration will be described with reference to FIGS. 1 and 2. Here, the program driving unit 104 in accordance with the embodiment of the present invention may directly execute a specific program that needs to be executed, or may request an execution of a specific program to an additional system (not shown).

First, the case in which the apparatus for detecting a malicious code in accordance with an embodiment of the present invention directly executes a specific program will be described.

Figure 2:
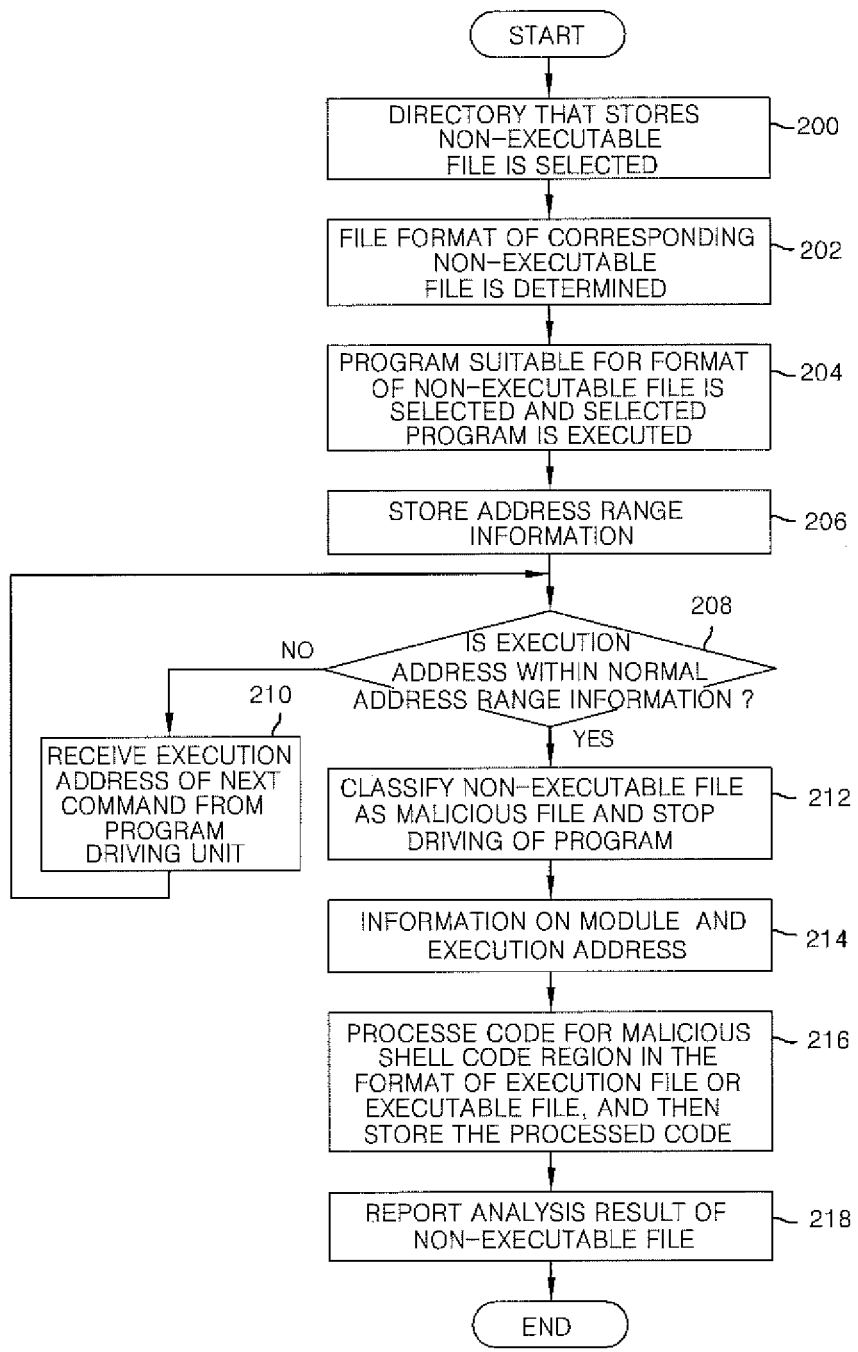
FIG. 2 is a flow chart illustrating procedures for analyzing a malicious code of a non-executable file in accordance with an embodiment of the present invention.

As shown in FIG. 2, when a user selects a directory that stores a non-executable file by using a user interface 102, the program driving unit 104 checks the format of the non-executable file in the selected directory. In other words, when the directory that stores the non-executable file as an inspection target is selected by the user interface 102 in operation 200, the program driving unit 104 determines the file format based on the file format information of the non-executable file stored in the corresponding directory. For example, when a specific route folder is selected among a plurality of route folders under a drive 1 by the user interface 102, the file format of the corresponding non-executable file is determined by checking the file format information of the non-executable file stored in the specific route folder in operation 202.

Next, the program driving unit. 104 searches the program suitable for the non-executable file from the program database 100 and executes the searched program in operation 204. The program driving unit 104 loads and executes the non-executable file on the searched program, and outputs the execution address of the command of the module in the program to the maliciousness determination unit 108. Here, the execution address refers to an address on the virtual memory 114 in the case of executing the command of the module, and such address is stored in the EIP register.

Next, the address storage unit 106 stores in the virtual memory 114 the normal address range information including a start address and an end address of a module loaded to the virtual memory 114 by the execution of the program in operation 206.

Then, the maliciousness determination unit 108 determines whether or not the execution address is within the normal address range information by comparing the execution address outputted from the program driving unit 104 and the normal address range information in operation 208.

When it is determined in operation 208 that the execution address is included in the normal address range information, the maliciousness determination unit 108 receives the execution address for a next command from the program driving unit 104 in operation 210 and then proceeds to operation 208 to determine again whether or not an execution address of a next command is within the normal address range information.

Meanwhile, when it is determined in operation 208 that the execution address is not within the normal address range information, it is determined that the register value is moved to the malicious shell code region. Then, the maliciousness determination unit 108 classifies the non-executable file as a malicious file and stops the driving of the program in operation 212.

Thereafter, the maliciousness determination unit 108 stores in the virtual memory 114 the information on the corresponding module (having vulnerability) in the program and the execution address before the movement to the malicious shell code region in operation 214, and provides such information to the cause analysis unit 112.

Meanwhile, the malicious code extraction unit 110 extracts the code for the region indicated by the execution address that is not within the normal address range information, i.e., the code for the malicious shell code, in the format of an execution file or an executable file and then stores the extracted code in the virtual memory 114 in operation 216.

The cause analysis unit 112 analyzes cause for vulnerability by comparing the prestored vulnerability information and the information on the module and the execution address provided from the maliciousness determination unit 108, and then provides the analysis result to a user or an analyzer so that the analysis result of the corresponding non-executable file may be reported in operation 216.

Then, if another non-executable file exists in the directory, the apparatus for detecting a malicious file extracts a next non-executable file from the directory and proceeds to operation 202 to perform next steps.

Hereinafter, the case in which the apparatus for detecting a malicious code in accordance with an embodiment of the present invention requests execution of a specific program to an additional system without directly executing a specific program will be described. Here, the system may be, e.g., a personal terminal having a malicious code inspection apparatus, a program providing server connected through a communication network (not shown) or the like, but is not limited thereto.

When a user selects the directory that stores the non-executable file by using the user interface 102, the program driving unit 104 checks the format of the non-executable file in the selected directory. In other words, when the directory that stores the non-executable file as a detection target is selected through the user interface 102 in operation 200, the program driving unit 104 determines the file format based on the format information of the non-executable file stored in the corresponding directory. For example, when a specific route folder is selected among a plurality of route folders under the drive 1 by the user interface 102, the file format of the corresponding non-executable file is determined by checking the file format information of the non-executable file stored in the specific route folder in operation 202.

Next, the program driving unit 104 requests the driving of the program suitable for the format of the non-executable file to a system (not shown). The system selects the program suitable for the format of the non-executable file and executes the program in operation 204. When the program is executed, the module is loaded. Then, the program driving unit 104 receives an execution address on a command basis of the loaded module from the system and outputs the received address to the maliciousness determination unit 108. Here, the execution address refers to the address on the virtual memory 114 in the case of executing the command in the module 7, and such address may be stored in the EIP register.

Thereafter, the address storage unit 106 stores in the virtual memory 114 the normal address range information including a start address and an end address of the module loaded in the virtual memory 114 by the execution of the program in operation 206.

Then, the maliciousness determination unit 108 determines whether or not the execution address is within the normal address range information by comparing the normal address information and the execution address outputted from the program driving unit 104 in operation 208.

When it is determined in operation 208 that the execution address is within the normal address range information, the maliciousness determination unit 108 receives an execution address of a next command from the program driving unit 104 in operation 210 and proceeds to operation 208 to determine whether the execution address of the next command is within the normal address range information.

Meanwhile, when it is determined in operation 208 that the execution address is not within the normal address range information, the register value is moved to the malicious shell code region. Therefore, the maliciousness determination unit 108 classifies the non-executable file as a malicious file and stops the driving of the program in operation 212.

Then, the maliciousness determination unit 108 stores in the virtual memory 114 the information on the module (having vulnerability) and the execution address before the movement to the malicious shell code region in operation 214 and then provides the corresponding information to the cause analysis unit 112.

Meanwhile, the malicious code extraction unit 110 processes the code for the region indicated by the execution file that is not within the normal address range information, i.e., the malicious shell code region, in the format of an execution file or an executable file, and then stores the corresponding code in the virtual memory 114 in operation 216.

The cause analysis unit 112 analyzes cause for vulnerability by comparing the prestored vulnerability information and the information on the module and the execution address provided from the maliciousness determination unit 108 and then provides the analyzed cause to a user or an analyzer so that the analysis result of the corresponding non-executable file may be reported in operation 216.

Thereafter, if another non-executable file exists in the directory, the apparatus for detecting malicious files extracts a next non-executable file from the directory and proceeds to operation 202 to perform next operations.

This embodiment has described, as an example, the case in which the execution address that is not within the normal address range information is determined to be malicious.

However, in another embodiment, even when the execution address is not within the normal address range information, the exception handling may be performed depending on whether or not the memory region indicated by the execution address has execution properties. The description thereof will be provided hereinafter.

Figure 3:
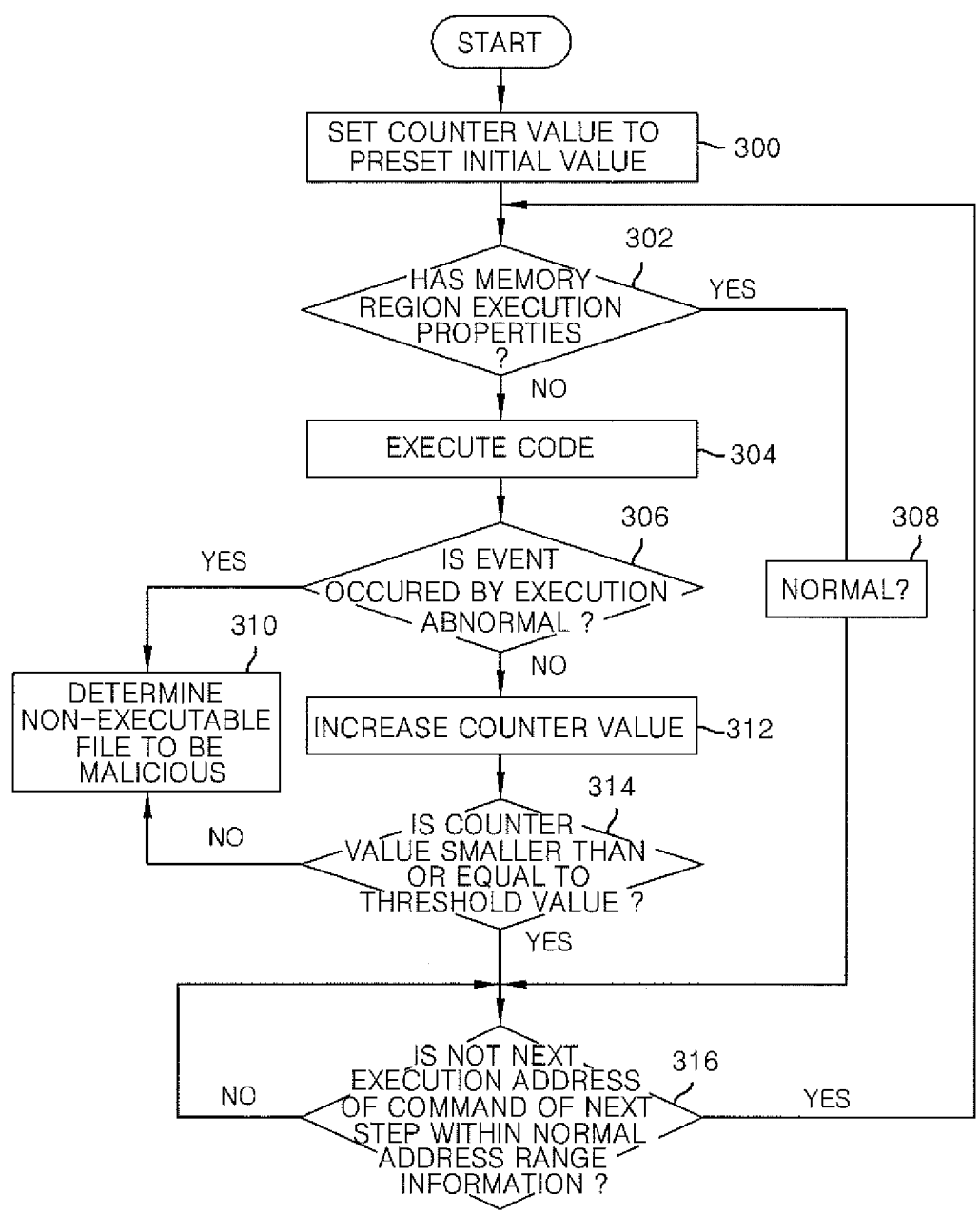
FIG. 3 shows an example of a method for detecting a malicious code of a non-executable file in accordance with an embodiment of the present invention.

FIG. 3 is a flow chart showing operations in the case where an apparatus for detecting a malicious file in accordance with another embodiment of the present invention indicates a region in which an execution address is not within the normal address range information.

As shown in FIG. 3, when a memory region that is not within the normal address range information is indicated by a first execution address, the maliciousness determination unit 108 sets a counter value to a preset initial value, e.g., "0", in operation 300, and then inspects whether or not the memory region indicated by the first execution address has execution properties in operation 302.

If it is determined in operation 302 that the memory region does not have execution properties, the maliciousness determination unit 108 executes a code in the memory region indicated by the first execution address in operation 304 and inspects whether an event occurs by the execution is abnormal in operation 306.

On the other hand, if it is determined in operation 302 that the memory region has execution properties, the maliciousness determination unit 108 determines the non-executable file to be normal in operation 308, and then compares the address range information and an address to be executed, i.e., a second execution address. If it is determined in operation 306 that the abnormal event occurs, the maliciousness determination unit 108 determines the non-executable file to be malicious in operation 310.

Meanwhile, if it is determined in operation 306 that the abnormal event does not occur, the maliciousness determination unit 108 increases a counter value by "1" in operation 312, and then determines whether or not counter value is smaller than or equal to a threshold value in operation 314.

If it is determined in operation 314 that the counter value is smaller than or equal to the threshold value, the maliciousness determination unit 108 determines whether or not the second execution address of the command of the next operation which is provided from the program driving unit 104 is within the normal address range in operation 316.

If it is determined in operation 316 that the next execution address of the command of the next operation, i.e., the second execution address, is not within the normal address range information, the maliciousness determination unit 108 proceeds to operation 302 for inspecting execution properties of the memory region indicated by the second execution address to perform next operations.

Meanwhile, if it is determined in operation 314 that the counter value is larger than the threshold value, the maliciousness determination unit 108 determines the non-executable file to be malicious.

If it is determined in operation 316 that the second execution address of the command of the next operation indicates the normal address range information, the maliciousness determination unit 108 compares the normal address range information and a third execution address of a next command.

In accordance with the apparatus and the method in accordance with the embodiments of the present invention, the normal address range information including a start address and an end address of a module that is normally loaded by execution of a program is stored in the virtual memory 114 and, then, an execution address of each command is extracted in the case of executing each command in the module loaded in the virtual memory 114. When the extracted execution address is not within the normal address range information, it is determined that a non-executable file contains a malicious code. Therefore, the malicious non-executable file may be detected before the malicious code is executed.

In accordance with the embodiments of the present invention, the static analysis of the malicious non-executable file may be performed by extracting the execution address of each command in the module loaded in the virtual memory 114 and providing the code in the malicious shell code region of the extracted execution address that is not within the normal address range information in the format of an execution file or an executable file.

Figure 4:
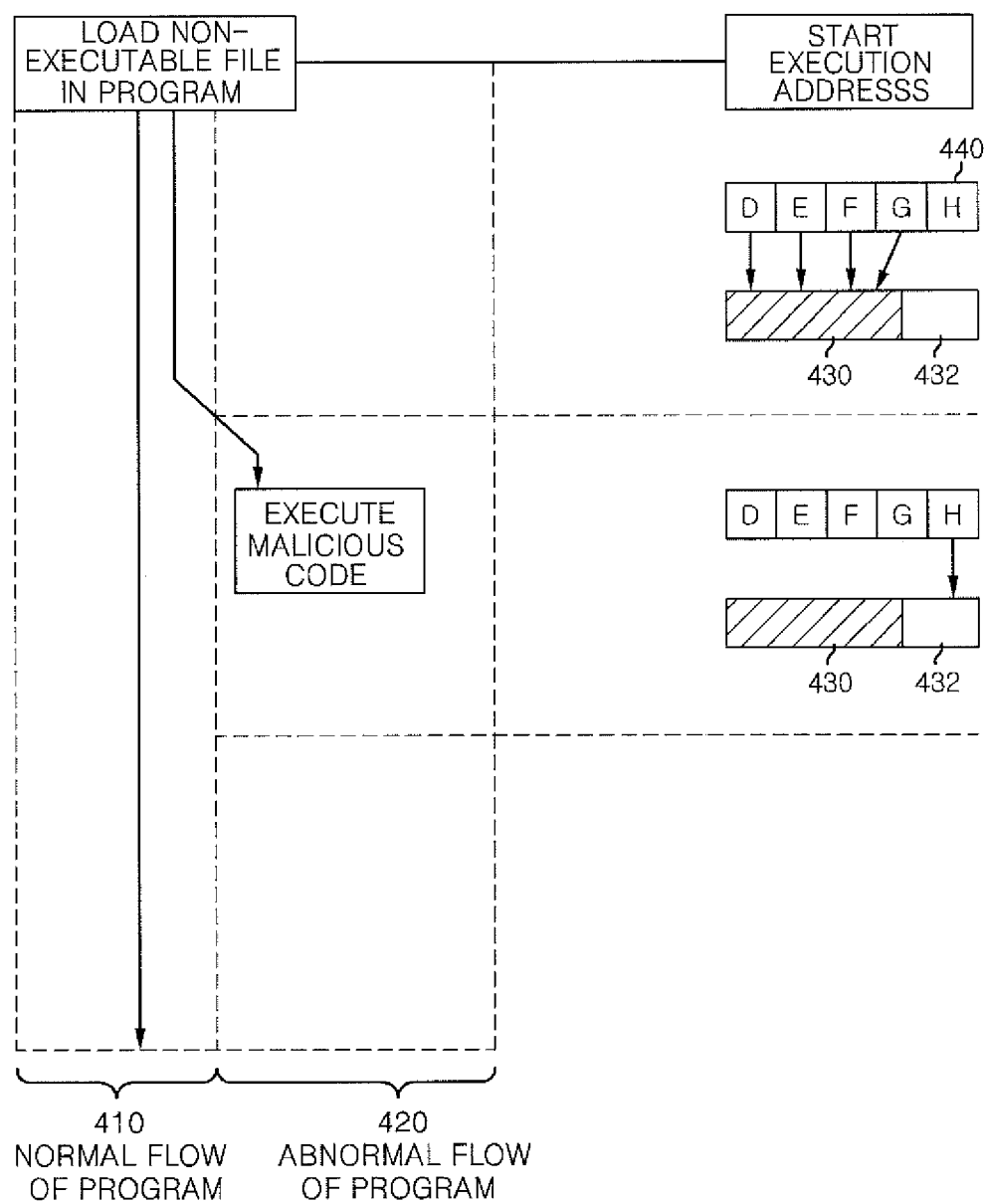
FIG. 4 is a flow chart showing operations performed when a region in which an execution address is not within normal address range information is indicated by an apparatus for detecting a malicious file in accordance with another embodiment of the present invention.

FIG. 4 shows an example of a method for inspecting a malicious code of a non-executable file in accordance with an embodiment of the present invention. Hereinafter, the malicious code inspection method in accordance with the embodiment of the present invention will be described with reference to FIG. 4.

When a non-executable file is executed in a program, the program may be executed from start to end in a normal flow 410. However, the program may be executed in an abnormal flow 420 due to the malicious code in the non-executable file.

When the non-executable file is loaded in the program, the address storage unit 106 stores in the virtual memory 114 the normal address range information 430 of the normally loaded program. Here, the normal address range information 430 includes a start address and an end address of a command in the normally loaded program.

Next, the maliciousness determination unit 108 analyzes the register value of the program by comparing the execution address 440 of the program and the normal address range information 430. At this time, the analysis section denotes a section continued from the loading of the non-executable file in the program until before the execution of the malicious code. In other words, before the malicious code is executed, the execution address of the program normally indicates the normal address range information. When the malicious code is executed, the execution address 440 indicates a region 432 that is not included in the normal address range information. For example, when D, E, F and G of the execution address 440 indicate the normal address range information 430, the program is executed in the normal flow 410. When H of the execution address 440 indicates the region 432 that is not within the normal address range information 430, the program is executed in an abnormal flow 420.

When the program is not executed in the normal flow 410 by the execution of the malicious code, the malicious code contained in the non-executable file loaded in the program may be executed. At this time, a malicious code image may be executed depending on types of malicious codes.

As described above, in the section where the malicious code is executed, the register value of the program, i.e., H of the execution address 440 of the module in the program, indicates the region 432 that is not within the normal address range information due to the execution of the malicious code. In that case, the apparatus for detecting malicious files in accordance with the embodiment of the present invention stores in the virtual memory 114 the information on the corresponding module in the program and G as an execution address that was within the normal address range information 430.

When the execution address of the module in the program indicates the region 432 that is not within the normal address range information, the apparatus for detecting malicious files in accordance with the embodiment of the present invention stops the program before the code of the region 432 corresponding to the execution address is stopped.

The combinations of blocks of the block diagrams and operations in the flow charts of the present invention may be implemented by computer program commands. The computer program commands may be provided to a processor of a general purpose computer, special purpose computer, or other programmable data processing apparatus, so that the commands executed via the processor of the computer or other programmable data processing apparatus create means for implementing the functions indicated in the blocks of the block diagrams or the operations in the flow charts. These computer program commands may also be stored in a computer-readable memory that may direct a computer or other programmable data processing apparatus to function in a particular manner, so that the commands stored in the computer-readable memory produce an article of manufacture including command means which implement the function indicated in the blocks of the block diagrams or the operations in the flow charts. The computer program commands may be loaded onto a computer or other programmable data processing apparatus to cause a series of operational steps to be performed on the computer or other programmable apparatus to produce a computer implemented process such that the commands executed on the computer or other programmable apparatus provide operations for implementing the functions indicated in the operations in the flow charts or the blocks of the block diagrams.

Each block or each operation may represent a part of a module, a segment or a code, including one or more executable commands for executing specific logical function(s). In addition, it should be noted that the functions mentioned in the blocks or operations may occur out of order in several alternative embodiments. For example, two blocks or operations shown in succession may be executed substantially concurrently, or may be executed in reverse order according to corresponding functions.

The above description is only an example of the technical concept of the present invention, and it will be understood by those skilled in the art that various changes and modifications may be made without departing from the original scope of the present invention. Therefore, the embodiments described in the present invention are not intended to limit the technical concept of the present invention, and are merely intended to describe the present invention. The scope of the present invention is not limited by those embodiments. The protection scope of the present invention should be defined by the accompanying claims and all technical spirits of equivalents thereof should be interpreted as being included in the scope of the present invention.

What is claimed is:

1. An apparatus for detecting a malicious file, comprising:
a processor; and
a memory for storing computer executable instructions that, when executed by the processor, cause the processor to implement:
a program driving unit for inputting an execution address of a command executed by driving a program corresponding to a non-executable file;
an address storage unit for storing normal address range information in accordance with the driving of the program; and
a maliciousness determination unit for determining whether the non-executable file is malicious depending on whether the execution address is not within the normal address range information;
wherein the maliciousness determination unit determines:
in response to the execution address is not within the normal address range information, whether or not a memory region indicated by the execution address has execution properties, and determines whether the non-executable file is malicious based on the determination result;
in response to the memory region indicated by the execution address does not have execution properties, whether the non-executable file is malicious by checking whether an abnormal event occurs due to an execution of a code stored in the memory region indicated by the execution address;
in response to the abnormal event does not occur, whether the non-executable file is malicious by checking whether an execution address from the next of the execution address to a predetermined operation is within the normal address range information; and
in response to the memory region indicated by the execution address is determined to have execution properties, the non-executable file to be normal.

2. The apparatus claim 1, wherein the program driving unit determines a file format of the non-executable file, and selects and drives a program for executing the non-executable file based on the determined file format.

3. The apparatus of claim 1, further comprising a malicious code extraction unit for extracting a code in a region corresponding to an execution address that is not included in the normal address range information.

4. The apparatus of claim 1, wherein the normal address range information includes a start address and an end address of a module loaded by the driving of the program.

5. The apparatus of claim 1, wherein the maliciousness determination unit stores an execution address of a command executed immediately before the execution of a command of the execution address that is not within the normal address range information.

6. An apparatus for detecting a malicious file, comprising:
a processor; and
a memory for storing computer executable instructions that, when executed by the processor, cause the processor to implement:
a program driving unit for inputting an execution address of a command executed by driving a program corresponding to a non-executable file;
an address storage unit for storing normal address range information in accordance with the driving of the program;
a maliciousness determination unit for determining whether the non-executable file is malicious depending on whether the execution address is not within the normal address range information; and
a cause analysis unit for analyzing cause for vulnerability by comparing vulnerability information and a module including a command related to the execution address that is not included in the normal address range information;
wherein the maliciousness determination unit determines:
in response to the execution address is not within the normal address range information, whether or not a memory region indicated by the execution address has execution properties, and determines whether the non-executable file is malicious based on the determination result;
in response to the memory region indicated by the execution address does not have execution properties, whether the non-executable file is malicious by checking whether an abnormal event occurs due to an execution of a code stored in the memory region indicated by the execution address;

in response to the abnormal event does not occur, whether the non-executable file is malicious by checking whether an execution address from the next of the execution address to a predetermined operation is within the normal address range information; and in response to the memory region indicated by the execution address is determined to have execution properties, the non-executable file to be normal.

7. A method for detecting a malicious file comprising:

obtaining an execution address of a command executed during driving of a program corresponding to a non-executable file;

storing normal address range information in accordance with the driving of the program; and determining, when the obtained execution address is not included in the normal address range information, whether the non-executable file is malicious;

wherein said determining whether the non-executable file is malicious includes:

determining, when the execution address is not included in the normal address range information, whether a memory region indicated by the execution address has execution properties;

determining whether the non-executable file is malicious based on the determination result;

checking, in response to the memory region indicated by the execution address does not have execution properties, whether an abnormal event occurs due to execution of a code stored in the memory region indicated by the execution address;

determining, in response to the abnormal event occur, the non-executable file to be malicious;

checking, in response to the abnormal event does not occur, whether an execution address from the next of the execution address to a predetermined operation indicates the memory region that is not included in the normal address range information; and determining, in response to the execution address for the predetermined step indicates the memory region that is not included in the normal address range information, the non-executable file to be malicious.

8. The method of claim 7, further comprising:

determining a format of the non-executable file, wherein a program corresponding to the non-executable file is driven based on the determined file format.

9. The method of claim 7, further comprising: extracting a code in a memory region indicated by the execution address that is not included in the normal address range information.

10. The method of claim 7, further comprising: analyzing cause for vulnerability by comparing vulnerability information and a module including a command related to an execution address that is not included in the normal address range information.

11. The method of claim 7, wherein the normal address range information includes a start address and an end address of a module loaded by driving of the program.

12. The method of claim 7, wherein said determining whether the non-executable file is malicious includes:

determining whether the execution address is within the normal address range based on a type of the executed command.

13. The method of claim 12, wherein when the command is structured exception handling (SEH), whether a chain value of the SEH is within the normal address range information is determined.

14. The method of claim 13, wherein when the command is return, call or jump, a single step is performed to determine whether or not the execution address indicated by the command is within the normal address range information.

15. The method of claim 7, further comprising: storing an execution address of a command executed immediately before the execution of a command of the execution address that is not within the normal address range information.

* * * * *